United States Patent [19]

DeBernardi et al.

[11] Patent Number: 4,820,323
[45] Date of Patent: Apr. 11, 1989

[54] METHOD OF FABRICATING OPTICAL WAVEGUIDES FOR THE MIDINFRARED PORTION OF THE SPECTRUM

[75] Inventors: Carlo DeBernardi; Eros Modone, both of Turin, Italy

[73] Assignee: Centro Studi e Laboratori Telecomunicazioni Spa, Turin, Italy

[21] Appl. No.: 101,186

[22] Filed: Sep. 25, 1987

[30] Foreign Application Priority Data

Sep. 25, 1986 [IT] Italy .................... 67732 A/86

[51] Int. Cl.$^4$ .............................................. C03C 21/00
[52] U.S. Cl. ........................................ 65/3.12; 65/30.1; 156/659.1; 501/37; 501/40; 501/904
[58] Field of Search .................. 65/3.11, 2, 3.12, 30.1; 501/37, 40, 904; 156/659.1

[56] References Cited

U.S. PATENT DOCUMENTS

| | | | |
|---|---|---|---|
| 3,951,659 | 4/1976 | Abita et al. | 65/30.1 X |
| 4,014,772 | 3/1977 | Henderson et al. | 65/30.1 X |
| 4,308,066 | 12/1981 | Mitachi et al. | 501/37 |
| 4,341,873 | 7/1982 | Robinson et al. | 501/40 |
| 4,383,016 | 5/1983 | Postupac | 65/30.1 X |

Primary Examiner—Robert L. Lindsay
Attorney, Agent, or Firm—Herbert Dubno

[57] ABSTRACT

The method consists of diffusing a doping compound in the region of a fluorozirconate glass support, wherein the optical guide is to be fabricated. The remaining regions are suitably masked to avoid any possible ionic exchange.

7 Claims, 2 Drawing Sheets

METHOD OF FABRICATING OPTICAL WAVEGUIDES FOR THE MIDINFRARED PORTION OF THE SPECTRUM

FIELD OF THE INVENTION

Our present invention relates to optical devices for light signal processing and, more particularly, to a method of fabricating optical waveguides for the midinfrared region of the spectrum.

BACKGROUND OF THE INVENTION

As is known, some devices presently used for light signal processing in the integrated optics domain, consist of oxide-based glasses, namely silica ($SiO_2$), in which optical guides are traced apt to make the light radiation go along a desired path.

The guiding region is generally fabricated by using a method which provides the diffusion of a doping material in the substrate material, or the replacement of the ions initially bonded or merely present as extraneous ions, in order to obtain well-bounded regions where the refractive index will assume particular values.

However, oxide-based glasses have high attenuation values at radiations with wavelengths in the midinfrared region of the electromagnetic spectrum extending from the visible region to about 12 m. This region is presently of high interest, namely in the domain of telecommunications using light signals propagating along optical fibers.

In fact, fibers can be made which have in the midinfrared an attenuation which is so low that very long trunks without intermediate repeaters are possible. Of course, these fibers require at their ends suitable signal processing devices (e.g. integrated optical devices).

Such fibers have been fabricated starting from halide based fibers, namely chlorides and fluorides. Methods of preparing such glasses are widely described in the technical literature. More particularly, a method of producing fluorozir conate glasses is described in U.S. Pat. No. 4,341,873. However, the use of such glasses in integrated-optics devices was not previously described.

OBJECTS OF THE INVENTION

It is an object to eliminate the attenuation disadvantage of integrated-optics devices made of oxide-based glasses, and to enable the fabrication of optical guides capable of transmitting radiation with wavelengths in the midinfrared region of the electromagentic spectrum.

SUMMARY OF THE INVENTION

The present invention provides a method of fabricating midinfrared optical guides in a glass-material substrate, comprising the steps of masking the substrate surfaces, so as to let free the only regions where the optical guide is to be made, and of diffusing a doping material that renders the refractive index of such regions higher, the diffusion being obtained by immersion of the masked substrate into a fused salt, into a solution or into a colloidal suspension of the doping compound and being started by high temperature and possibly by an electric field, characterized in that said substrate is made of fluorozirconate glass and the dopant is a cation bonded to a fluoride capable of increasing the refractive index in the substrate regions into which it diffuses.

BRIEF DESCRIPTION OF THE DRAWINGS

The above and other objects, features and advantages of the present invention will become more readily apparent from the following description, reference being made to the accompanying drawing, in which.

SPECIFIC DESCRIPTION

Figure 3:
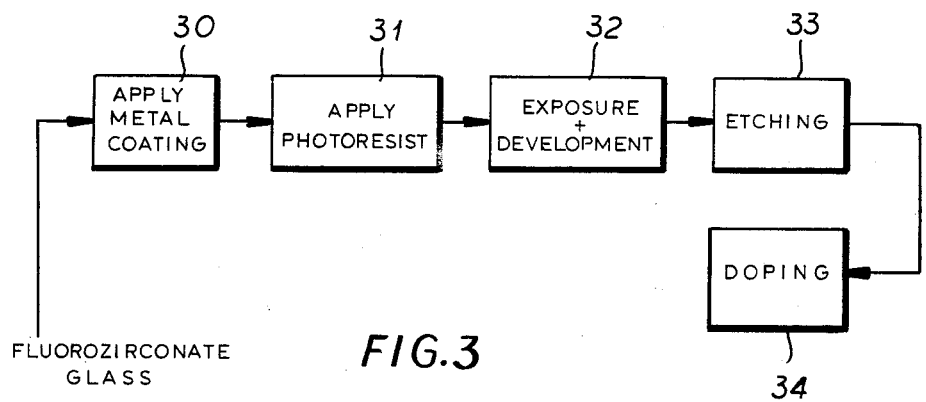
FIG. 3 is a block diagram illustrating the method.

Referring first to FIG. 3, it can be seen that the basic steps in the method are the application at 30 of a metal coating to a fluorozirconate glass substrate which is to form an integrated optics unit in accordance with the invention. The principles of such integrated optics are known and this invention is directed only to the formation of a particular optical waveguide structure therein.

SPECIFIC EXAMPLE

In the following example a method is described of fabricating an optical guide in a substrate made with a multicomponent fluoride based glass. The main component being zirconium fluoride, $ZrF_4$; such glasses are also referred to as fluorozirconate glasses.

Glasses prepared with mixtures of the $ZrF_4:BaF_2:TrF_3:XaF_b$ or $ZrF_4:BaF_2:TrF_3:X_aF_b$ types are particularly advantageous, where Tr stands for any rare earth and X for an element whose concentration variation or whose substitution determines the required refractive index variation. Variables a, b represent the number of elements x and F per molecule.

Figure 1:
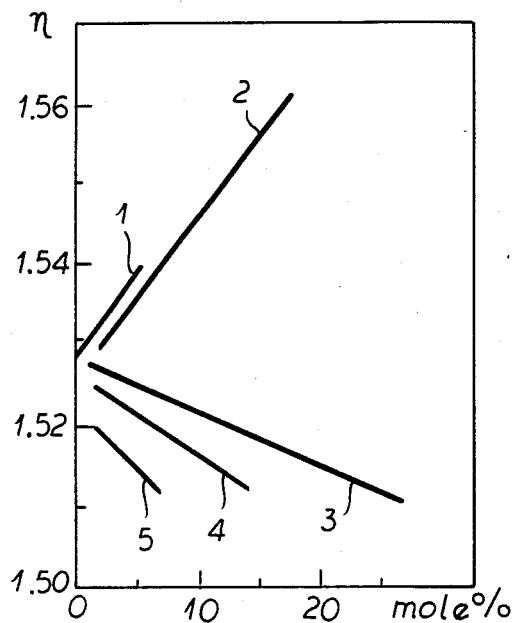
FIG. 1 is a graph illustrating the relationship between refractive index (plotted along the ordinate) and doping concentration (plotted along the ordinate) for various doping compounds used in accordance with the invention.
Figure 2:
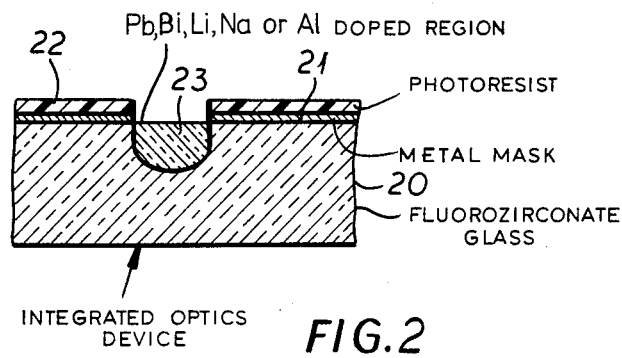
FIG. 2 is a diagrammatic cross section through a portion of an integrated optics device in accordance with the invention.

FIG. 1 is a Cartesian diagram where refractive-index value n is represented in function of the mole percent of different dopants in a mixture whose rare earth is gadolinium (Gd). Curves 1, 2, 3, 4 and 5 are referred respectively to $PbF_2$, $BiF_3$, $LiF$, $NaF$ and $AlF_3$. With a matrix composed of other rare earth the behavior is analogous.

Supposing that the element X the substrate is made of be one of those represented in FIG. 1, e.g. Na, its ion-exchange with Li is easily obtained, since they belong to the same group of the periodic table of the elements and the ionic radius of lithium is smaller than that of sodium. Furthermore, electric conductivity values confirm a sufficient ionic mobility both for lithium and for sodium, brought to a convenient temperature.

This exchange is particularly advantageous because lithium fluoride raises the retraotive index with respect to that obtained from sodium-fluoride presence, as it can be easily seen in FIG. 1 and thus allows the fabrication of guiding optical paths for light radiation.

According to a first embodiment of the method, a fluorozirconate glass plate containing sodium fluoride is prepared for fabricating the optical guide conveniently masking its surfaces. This can be made by using the well-known lithographic techniques after depositing on the plate an even metallic or dielectric layer, and covering it with a photosensitive layer. This layer is exposed so as to facilitate the chemical etching of covering metallic or dielectric zones coinciding with those where the optical guide will be fabricated by a local alteration in the glass refractive index.

To this end the masked plate is immersed in a fused lithium salt, or in a solution, or yet in a colloidal suspension of the same compound, and left for a determined time period at a temperature of 150° C. or more, so as to obtain an enrichment in lithium ions and a depletion of sodium ions to the required depth.

The phenomenon takes place for ion diffusion owing to the concentration gradient existing in correspondence with the surface separating the plate and the bath and the higher the temperature, the quicker the process, and the longer the time interval during which the plate immersion lasts, the deeper the exchange zone.

In a second embodiment of the method the doping ion diffusion from the liquid to the plate is accelerated by applying an electric field. To this aim a metallic layer is deposited on the face of the plate opposite to the masked surface and is connected to the terminal of a current generator while an electrode immersed in the liquid is connected to the other terminal.

In this way the doping ion movement in the plate is sped up and addressed in the desired direction.

By a suitable combination of direction and intensity of the electric field, of temperature and process time, it is possible to obtain penetration depth, concentration profile and fraction of ion substitution of the involved region, varying in a wide interval and capable of being controlled in function of the desired applications for the guides obtained in this way.

We claim:

1. A method of making an optical midinfrared waveguide, comprising the steps of:

masking a surface of a fluorozirconate glass substrate having a composition substantially of:

$ZrF_4:BaF_2:TrF_3:X_aF_b$ wherein Tr is a rare earth element, X is an atom of an element whose concentration in the glass of the substrate determines the refractive index or whose concentration variation determines the refractive index variation of the substrate, and a and b are respectively the numbers of atoms of X per molecule and the number of atoms of F bonded to X to satisfy the valence sites thereof, at predetermined regions and exposing at least one other region of said surface; and diffusing into said other region of said surface under an electric field, while said other region of said surface is exposed, a dopant consisting of at least one cation bonded to fluoride, selected from the group which consists of $AlF_3$, $PbF_2$, $BiF_3$, LiF and NaF, and capable of increasing the refractive index in said other region, thereby forming an optical midinfrared waveguide in said other region while the predetermined regions at which said surface was masked do not form an optical midinfrared waveguide.

2. The method defined in claim 1 wherein said dopant is diffused into said other region by immersing the masked substrate in a fused salt containing said cation bonded to fluoride at an elevated temperature.

3. The method defined in claim 1 wherein said dopant is diffused into said other region by immersing the masked substrate in a solution containing said cation bonded to fluoride at an elevated temperature.

4. The method defined in claim 1 wherein said dopant is diffused into said other region by immersing the masked substrate in a colloidal suspension containing said cation bonded to fluoride at an elevated temperature.

5. The method defined in claim 1 wherein said dopant is diffused into said other region at an elevated temperature.

6. The method defined in claim 1 wherein $X_aF_b$ is selected from the group which consists of $AlF_3$, $PbF_2$, $BiF_3$, LiF and NaF.

7. The method defined in claim 6 wherein Tr is gadolinium.

* * * * *